United States Patent
Fleischmann et al.

(10) Patent No.: US 8,851,924 B2
(45) Date of Patent: Oct. 7, 2014

(54) ELECTRICAL ASSEMBLY CONNECTION OF A MOTOR VEHICLE

(71) Applicant: Brose Fahrzeugteile GmbH & Co. Kommanditgesellschaft, Wuerzburg, Wuerzburg (DE)

(72) Inventors: Karl-Heinz Fleischmann, Marienwerder (DE); Alexander Gass, Berlin (DE)

(73) Assignee: Brose Fahrzeugteile GmbH & Co. Kommanditgesellschaft, Wuerzburg, Wuerzburg (DE)

(*) Notice: Subject to any disclaimer, the term of this patent is extended or adjusted under 35 U.S.C. 154(b) by 0 days.

(21) Appl. No.: 13/665,288

(22) Filed: Oct. 31, 2012

(65) Prior Publication Data
US 2013/0052874 A1 Feb. 28, 2013

Related U.S. Application Data

(63) Continuation of application No. PCT/EP2011/001497, filed on Mar. 25, 2011.

(30) Foreign Application Priority Data

May 4, 2010 (DE) ............... 20 2010 006 401 U (51) Int. Cl.

| H01R 13/648 | (2006.01) |
|---|---|
| H01R 13/52 | (2006.01) |
| F04D 25/06 | (2006.01) |
| H01R 13/58 | (2006.01) |
| H02K 5/22 | (2006.01) |
| F04D 25/08 | (2006.01) |
| H02G 1/14 | (2006.01) |
| H02G 15/00 | (2006.01) |
| H01R 13/405 | (2006.01) |
| H02G 15/013 | (2006.01) |

(52) U.S. Cl.
CPC ............ *H01R 13/5216* (2013.01); *H02G 1/145* (2013.01); *F04D 25/0693* (2013.01); *H01R 2201/26* (2013.01); *H01R 13/5845* (2013.01); *H02K 5/225* (2013.01); *H02G 15/003* (2013.01); *F04D 25/08* (2013.01); *H01R 13/405* (2013.01); *H02G 15/013* (2013.01); *H01R 2201/10* (2013.01)
USPC ................ 439/587; 439/607.57; 439/606

(58) Field of Classification Search
USPC ............... 439/936, 587, 607.57, 607.58, 589, 439/604, 606
See application file for complete search history.

(56) References Cited

U.S. PATENT DOCUMENTS

| 3,744,128 A | * | 7/1973 | Fisher et al. ................... 29/858 |
| 4,335,932 A | * | 6/1982 | Herrmann, Jr. ............... 439/587 |

(Continued)

FOREIGN PATENT DOCUMENTS

| DE | 3640695 A1 | 6/1988 |
| DE | 4116748 C1 | 10/1992 |

(Continued)

OTHER PUBLICATIONS

International Search Report of PCT/EP2011/001497, Nov. 6, 2012.

*Primary Examiner* — Gary Paumen
(74) *Attorney, Agent, or Firm* — Laurence A. Greenberg; Werner H. Stemer; Ralph E. Locher (57) ABSTRACT

An electrical motor connection, in particular of an electrical cooling fan motor for a motor vehicle, has a connected cable harness whose cable ends are connected to a motor-end connecting terminal. A connecting housing has two housing parts, which are joined together in the assembled state to form a cavity, and which hold connection-end cable ends of the cable harness. One of the housing parts has at least one filling opening, which opens into the cavity, for filling with a curable encapsulation compound, and with the cured encapsulation compound surrounding the cable ends in the area of the connecting terminal, and being joined to the housing parts.

11 Claims, 5 Drawing Sheets

(56) References Cited

U.S. PATENT DOCUMENTS

| | | | |
|---|---|---|---|
| 4,433,206 A * | 2/1984 | Lewis | 174/359 |
| 5,145,402 A * | 9/1992 | Plyler et al. | 439/459 |
| 5,194,021 A * | 3/1993 | Oba et al. | 439/589 |
| 5,569,882 A | 10/1996 | Yokoyama et al. | |
| 5,630,732 A * | 5/1997 | Yamanashi | 439/589 |
| 5,795,170 A * | 8/1998 | Okabe | 439/252 |
| 6,464,543 B2 * | 10/2002 | Suzuki | 439/736 |
| 6,796,821 B2 * | 9/2004 | Cairns et al. | 439/204 |
| 6,964,575 B1 * | 11/2005 | Sailor | 439/76.1 |
| 7,238,036 B2 * | 7/2007 | Sato et al. | 439/236 |
| 7,387,551 B2 * | 6/2008 | Kurahashi | 439/76.1 |
| 7,390,217 B2 * | 6/2008 | Scott | 439/604 |
| 7,445,481 B2 * | 11/2008 | Nagashima et al. | 439/276 |
| 8,007,302 B2 * | 8/2011 | Kleinke | 439/275 |
| 8,076,810 B2 | 12/2011 | Spaggiari | |
| 8,272,895 B2 * | 9/2012 | Park | 439/587 |
| 8,277,250 B2 * | 10/2012 | Suzuki et al. | 439/604 |
| 2006/0207092 A1* | 9/2006 | Perle et al. | 29/877 |
| 2009/0258521 A1 | 10/2009 | Ooki | |
| 2013/0065427 A1* | 3/2013 | Fleischmann et al. | 439/465 |

FOREIGN PATENT DOCUMENTS

| | | |
|---|---|---|
| DE | 10259007 A1 | 7/2004 |
| JP | 10233247 A | 9/1998 |
| WO | 2007/129205 A2 | 11/2007 |

* cited by examiner

ELECTRICAL ASSEMBLY CONNECTION OF A MOTOR VEHICLE

CROSS-REFERENCE TO RELATED APPLICATION

This application is a continuation, under 35 U.S.C. §120, of copending international application No. PCT/EP2011/001497, filed Mar. 25, 2011, which designated the United States; this application also claims the priority, under 35 U.S.C. §119, of German patent application No. DE 20 2010 006 401.5, filed May 4, 2010; the prior applications are herewith incorporated by reference in their entirety.

BACKGROUND OF THE INVENTION

Field of the Invention

The invention relates to an electrical assembly connection for a motor vehicle having a connected cable harness, the cable ends of the cable harness being connected to an assembly-end connection terminal. In this context, an assembly connection is understood to mean, in particular, an electrical motor connection, for example for a radiator fan motor of the motor vehicle.

An assembly which is to be electrically connected to the on-board electrical supply system of a motor vehicle usually has a connection terminal (assembly interface) which is routed out of the housing of the assembly, the connection contacts (connection points) of the connection terminal being electrically insulated from one another and from the surrounding area. The assembly is generally electrically connected to the on-board electrical supply system of the motor vehicle by cables of a cable harness which is routed into an on-board electrical supply system cable, one cable or cable harness end of the cable harness having a plug connection, and the other cable or cable harness end thereof being electrically conductively connected to the assembly, which is to be supplied with power, by the connection terminals thereof. The electrical assembly connection of the individual cables of the cable harness with the connection terminal can be established by a welded connection, a solder connection, a clamping connection or a crimped connection.

An assembly connection of this kind is also provided, in particular, in an electric motor which has connection cables and which is used, for example, as a drive for a radiator fan (radiator fan motor) for the motor vehicle. The radiator fan motor is operated by an electrical or electronic control circuit in order to adjust the required cooling power. The radiator fan motor is supplied with power by an on-board electrical supply system cable which is connected to a DC source (vehicle battery) of the motor vehicle. In this case, the cable ends of the cable harness, which is routed from the on-board electrical supply system cable, are connected to the connection terminal which virtually forms the motor interface to the electric motor used, this electric motor usually being electronically controlled. In this case, the cable harness generally contains, in addition to the power supply cables, that is to say the positive pole and the negative pole of the supply voltage, control cables and/or signal cables of an electronics system which controls the electric motor and/or processes detected motor data. During production of the electrical assembly connection or motor connection, electrical contact is usually made between the contacts (connection parts) of the connection terminal and the cable ends by welded connections.

One problem with an assembly or motor connection of this kind is mechanical loading, in particular tensile loading, between the on-board electrical supply system cable, which contains the cable harness, and the connection terminal of the electric motor. Tensile loading of this kind can lead to damage or disconnection of the electrical contact at the assembly or motor connection.

A further problem is presented by environmental influences such as temperature fluctuations and moisture which can lead to corrosion at the assembly or motor connection (connection terminal) with a high contact resistance or mechanical instability (loose contact). A short circuit which may occur across the assembly or motor connection can lead to damage in the on-board electrical supply system or in the assembly. Furthermore, the usually prescribed shock protection may be compromised.

SUMMARY OF THE INVENTION

The invention is based on the object of specifying a particularly secure and reliable assembly or motor connection which has a long service life.

According to the invention, this object is achieved by the features of the claims. Advantageous refinements, developments and variants are the subject matter of the dependent claims which refer back to the main claim.

Accordingly, an electrical assembly connection, in particular a motor connection of an electrical radiator fan motor, for a motor vehicle, having connected cables is provided, the cable ends of the cable being covered by a connection housing. In this case, the connection housing has two housing parts which are combined so as to form a hollow space in the assembled state and accommodate the connection-end cable ends of the cables of the cable harness. One of the housing parts, in particular a cover-like housing upper part, has at least one filling opening, which issues into the hollow space in the assembled state, for pouring in a curable encapsulation compound.

The encapsulation compound is expediently a material with good adhesion properties, for example a silicone, polyurethane or a casting resin. Furthermore, one housing part has a venting opening. When pouring in the encapsulation compound, two or three filling openings, for example, allow the encapsulation compound to be distributed in the hollow space in the connection housing in a quick and uniform manner. Furthermore, one housing part has a venting opening. The venting opening allows rapid filling without disadvantageous air bubbles forming in the encapsulation compound. In the cured state, the encapsulation compound surrounds the electrical assembly or motor connection within the connection housing and is joined to the housing parts in a virtually undetachable manner—in the sense of adhesive bonding. The connection housing therefore advantageously remains permanently on the assembly or motor connection, that is to say is a permanent constituent part thereof.

In an advantageous development, one of the housing parts contains at least one cable bushing which has a conical guide inner contour which opens in the direction of the connection terminal, a clamping part resting against the guide inner contour. As a result of tensile loading on the cable harness, the clamping part slides along the corresponding guide inner contour, with the result that the clamping action on the corresponding cable increases as the tensile loading increases. The corresponding housing part preferably has two cable bushings of this kind for the current-carrying cables (positive pole cables and negative pole cables) with conical guide inner contours which interact with corresponding clamping parts.

In an expedient refinement of the assembly or motor connection, only one of the housing parts is in the form of a shell, while the other housing part is then configured as a housing cover. In addition, both housing parts can be configured as housing half-shells. The housing lower part, which has the guide inner contours, is preferably in the form of a shell, while a cover-like housing upper part is fitted with the corresponding clamping parts. Whereas the number of guide inner contours and clamping parts appropriately corresponds to the number of supply cables, the control or signal cables can be situated, at the connection end, in the connection housing without cable guidance of this kind. To this end, the control or signal cables are configured to be longer, and therefore project further into the connection housing than the power supply cables which are relieved of tensile load by clamping parts, and are thus protected on account of tensile forces being absorbed by the cables which are relieved of load by the clamping parts.

The clamping part rests against the respective cable and has a conical or wedge-like outer contour which tapers away from the connection terminal, that is to say in the opposite direction to the connection terminal, and rests against the guide inner contour. Furthermore, one of the housing parts has at least one fixing element which engages in an interlocking manner in a corresponding collar contour of the assembly or motor housing in the region of the connection terminal in the assembled state.

Insertion of the cables of the cable harness is simplified by virtue of the shell-like and cover-like configuration of the housing parts. The connection between the connection housing-end fixing element and the assembly-end collar contour ensures that the connection housing is held on the assembly or on the motor housing in a particularly simple and effective manner, in particular in the event of tensile loading between them. Furthermore, the interlocking connection between the two-part connection housing and the assembly facilitates uniform and correct positioning of the connection housing by providing guidance when fitting the housing lower part.

The guide inner contour and the clamping part, which are configured in a conical or wedge-shaped manner in particular, create a particularly effective force-fitting or frictional connection since the holding forces act radially on the cables in the event of tensile loading and increase as the tensile force increases. In particular, the combination and arrangement of the interlocking connection between the connection housing and the assembly and the tensile force-dependent cable clamping ensure reliable relief of tensile loading, with the result that electrical contact between the cables and the electrical assembly by the on-board electrical supply system cable is reliably maintained in the event of tensile loading.

The housing parts are locked to one another in the assembled state, wherein the assembled housing parts at least partially engage over the assembly or motor connection and, in this case, in particular the connection terminal with the cable ends with which contact is made at the connection points of the connection terminal. Furthermore, one of the housing parts, in particular the shell-like housing lower part, has spacer elements which project into the hollow space. The cables of the cable harness are arranged between the spacer elements in the assembled state of the connection housing. The spacer elements prevent unintentional movement of the cables. On account firstly of the housing parts being locked and secondly of the assembled housing parts being engaged over in the region of the connection terminal, the hollow space which is formed from the housing parts is tightly surrounded, as a result of which the encapsulation compound is prevented from leaking during filling and curing. As a result of leakage being prevented, further process or processing steps can be performed as early as during curing of the encapsulation compound, as a result of which the cycle time and the costs of production of the assembly or of the radiator fan motor are reduced.

This is advantageously achieved by the two-part, assembled connection housing remaining on the electrical assembly or on the electric motor, with the result that the encapsulation is shaped during curing without additional tools. The material of the connection housing, which virtually serves as a container for the encapsulation compound, and the material of the insulation of the connection terminal of the assembly or of the electric motor should have good adhesion properties in relation to the encapsulation material used. The material of the connection housing (container) should ideally correspond to the encapsulation material of the connection terminal.

The impermeability of the connection or of the connection points to moisture is ensured by virtue of the components (connection housing and connection terminal) being adhesively bonded to one another. At the same time, this determines the mechanical stability and the shape of the encapsulation material. On account of the encapsulation compound which has an appropriately low viscosity being poured into the connection housing which surrounds the connection region, the assembly can be transported further when the encapsulation compound is still in the largely highly fluid, uncured state, with the result that the further process steps can be executed as the curing time elapses. This means that it is not necessary to wait until the encapsulation compound is dimensionally stable in the further process sequence. This leads to a significant reduction in the manufacturing time required for the encapsulation and the further processing of the assembly. At the same time, reliable relief of tensile loading on the connection points of the cables is provided by the configuration of the connection housing in conjunction with the configuration of the connection region of the assembly or of the electric motor or of a drive which contains one of these elements.

Surrounding the assembly or motor connection with encapsulation compound in the manner of a seal and joining the housing parts of the connection housing to the cured encapsulation compound ensure particularly effective protection against environmental influences and mechanical loading. The fluid encapsulation compound being distributed around the connection terminal and the cable ends which make contact with the connection terminal and, in the process, within the connection housing provides a high degree of flexibility virtually independently of the shape of the assembly or motor connection.

Other features which are considered as characteristic for the invention are set forth in the appended claims.

Although the invention is illustrated and described herein as embodied in an electrical assembly connection of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are provided with the same reference symbols in all the figures.

Figure 1:
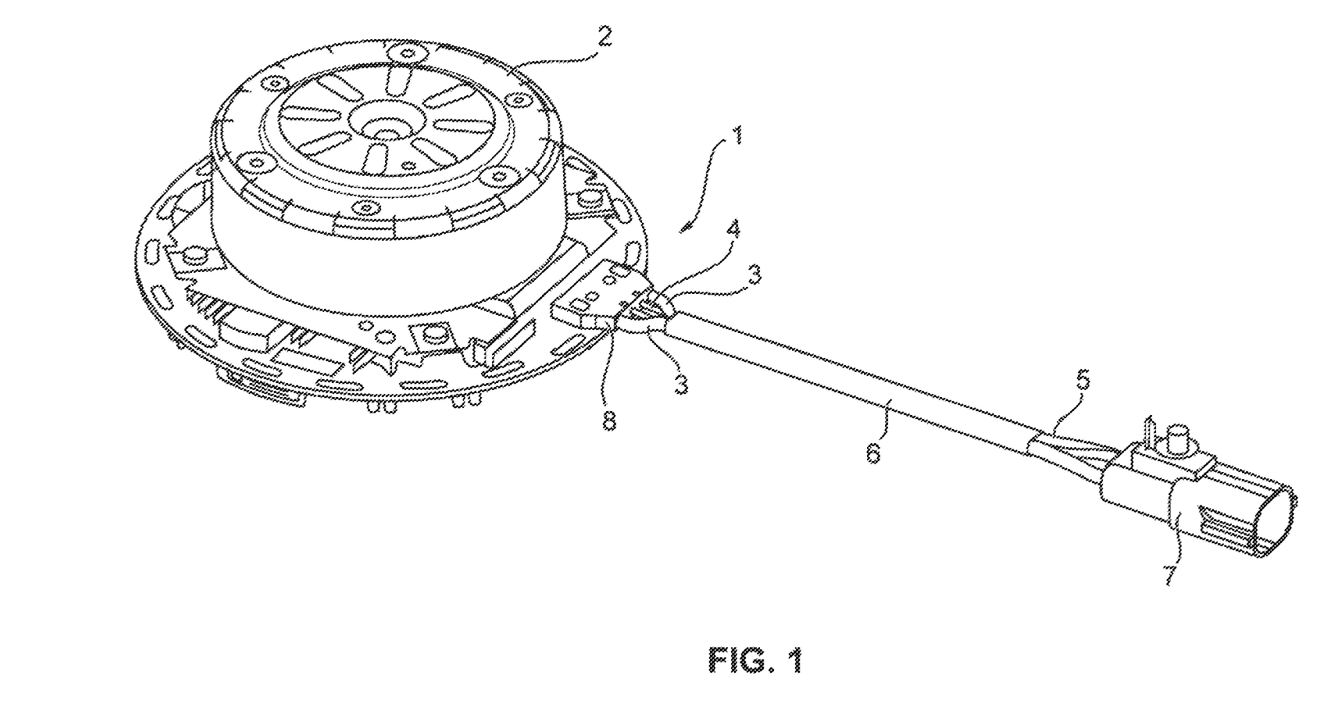
FIG. 1 is a diagrammatic, perspective view of a motor connection of an electric radiator fan motor, having cables of a on-board electrical supply system cable which are connected to the motor connection and having a connection housing which is filled or can be filled with encapsulation compound according to the invention.

FIG. 1 shows a perspective illustration of an electrical motor connection 1 of a DC radiator fan motor (electric motor) 2 having power supply cables 3 and signal or control cables 4 of a cable harness 5 of an on-board electrical supply system 6 connected to it. The on-board electrical supply system 6 is fitted with a plug connector 7 at an end which is remote from the radiator fan motor 2. A connection housing 8 which is filled with encapsulation compound surrounds a connection terminal (not shown here) of the radiator fan motor 2. Due to the required current-carrying capability, the power supply cables 3 have a comparatively large cable diameter in relation to the control or signal cables 4. Instead of the radiator fan motor 2, a different electrical assembly with connected cables can also form the connection as the assembly connection 1.

Figure 2:
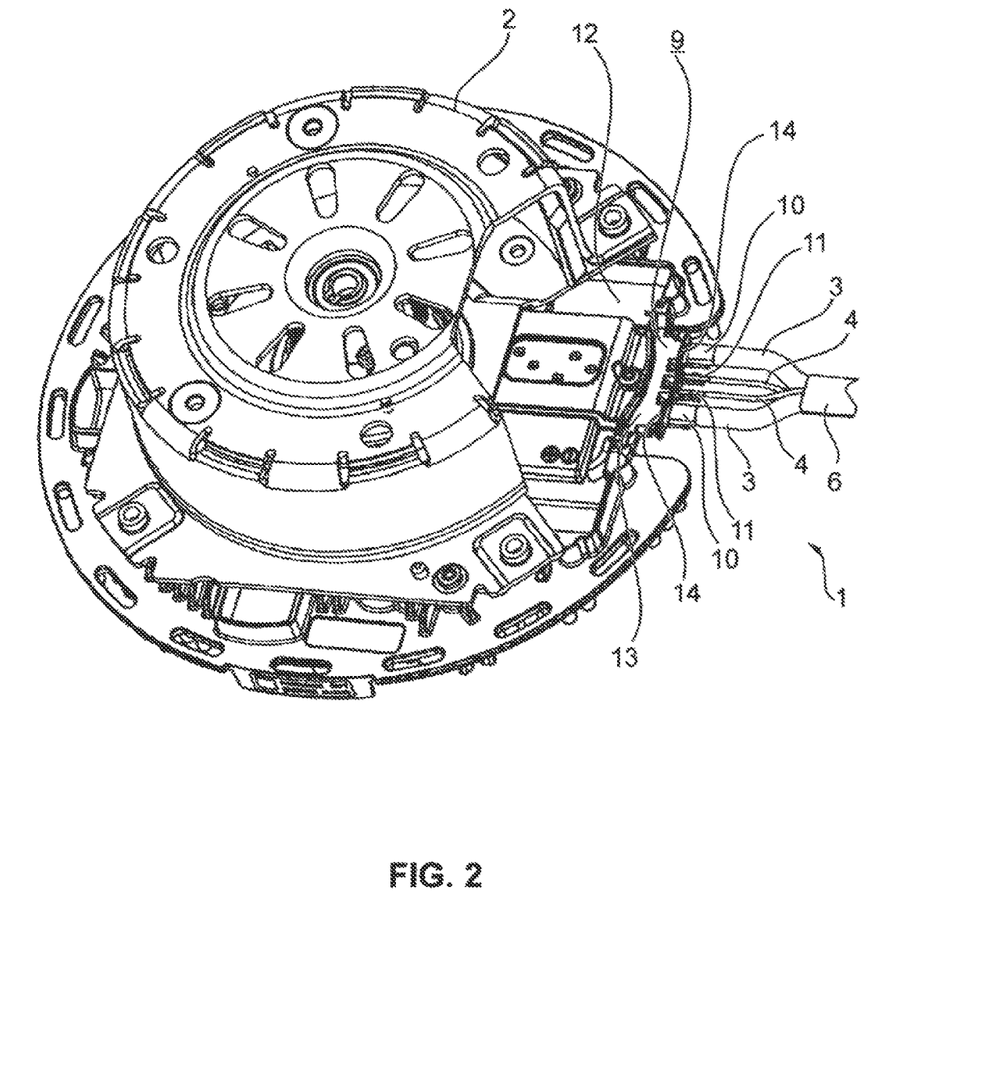
FIG. 2 is a diagrammatic, perspective view of the radiator fan motor with a view of a connection terminal without a connection housing.

FIG. 2 shows a perspective view of the radiator fan motor 2 with a view of a connection terminal 9 of the radiator fan motor having a number of connection contacts (connection points) 10 and 11 which corresponds to the number of power supply and signal or control cables 3 and 4. The connection terminal 9 forms a kind of motor interface which is firstly connected to an electronics system 12 of the radiator fan motor 2, the connection contacts 10, 11 of the connection terminal or motor interface being formed by a stamped sheet-metal comb which is composed of sheet copper. The conductor ends of the cables 3, 4, which conductor ends are connected to the connection contacts or points 10, 11 and therefore to the connection terminal 9, in particular which are electrically conductively contacted by welding, form the motor connection 1.

During operation of the radiator fan, the radiator fan motor 2 is supplied with direct current by the power supply cables 3 which are connected to the vehicle battery in a manner which is not described in any detail. The control or signal cables 4 are used to control the motor 2 or to interchange data with the radiator fan electronics system 12 and a vehicle electronics system. For example, control instructions are transmitted from the motor vehicle electronics system to the radiator fan motor 2 or operating information about the radiator fan motor 2, for example the rotation speed, is transmitted to the motor vehicle electronics system 12 by the control and signal cables 4 during operation of the radiator fan.

Adjacent to the cable ends of the cables 3, 4, the connection terminal 9 is provided in regions with an insulating encapsulation 13 comprising polybutylene terephthalate (PBT) which surrounds the connection contacts 10, 11 in a subregion. The encapsulation 13 has a collar or interlocking contour 14 on both sides of the connection terminal 9.

Figure 3:
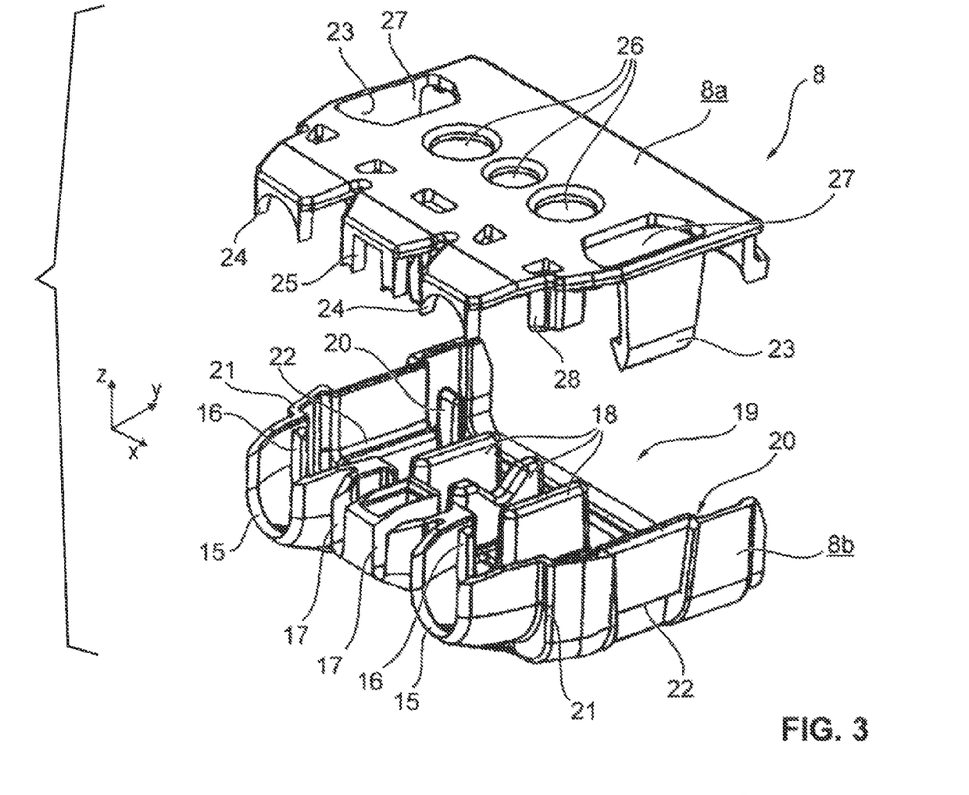
FIG. 3 is a diagrammatic, exploded perspective view of the connection housing containing a cover-like housing upper part and a shell-like housing lower part.
Figure 4:
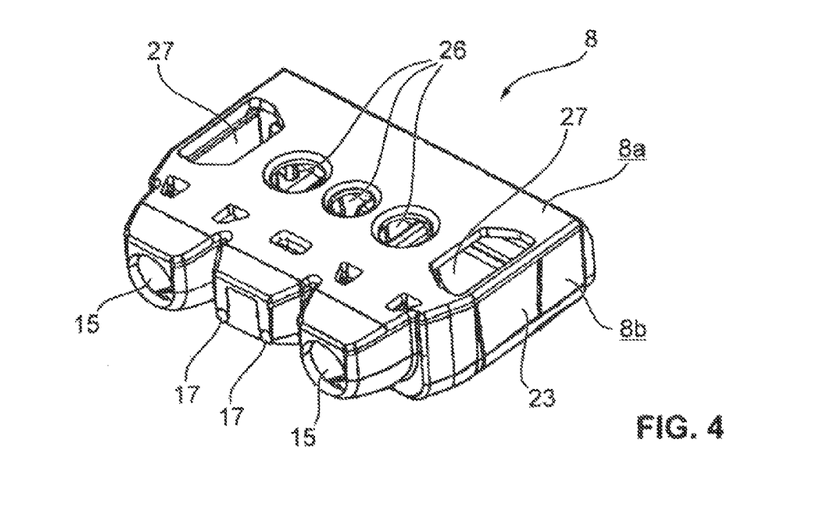
FIG. 4 is a perspective view of the connection housing containing the cover-like housing upper part and the shell-like housing lower part in an assembled state.

FIGS. 3 and 4 show perspective views of a connection housing 8 with a cover-like housing upper part 8a and a shell-like housing lower part 8b in the unattached state and, respectively, in the assembled state. The two housing parts 8a and 8b are produced from a thermoplastic, for example from polybutylene terephthalate (PBT). The shell-like housing lower part 8b has conical guide inner contours 16 in the region of cable bushings 15 for the power supply cables 3.

Two cable bushings 17 for the control and signal cables 4 in the housing lower part 8b are located between the two outer cable bushings 15 for the power supply cables 3 along the x-direction with respect to the illustrated coordinate system. In addition, three dome-like spacer elements 18 are integrally formed on the floor of the housing lower part 8b in the insertion directions, which run in the y-direction, for the cables 3, 4 in the exemplary embodiment. In the case of cable ends of the cables 3, 4 being situated in the connection housing 8, the spacer elements run between the cable ends and project into a hollow space 19 which is formed between the housing upper part 8a and the housing lower part 8b.

Furthermore, the housing lower part 8b has fixing elements 20, which are integrally formed on the inside of that housing face which is situated opposite the cable bushings 15, 17, on those housing walls 21 of the housing lower part 8b which are situated opposite in the x-direction. The housing lower part 8b also has two latching recesses 22 on the housing walls 21 which are situated opposite one another. Latching hooks 23 which are integrally formed on the housing cover 8a engage in the latching recesses 22. FIG. 4 shows the state of the connection housing 8 in which it has been assembled by the latching connection 22, 23 so as to form the hollow space 19.

Recesses 24 which are integrally formed in the housing upper part 8a form a continuation of the cable bushings 15 to form a circular shape in the assembled state of the connection housing 9 which is shown in FIG. 4. A recess 26 which is integrally formed between the recesses 24 and is angular in the exemplary embodiment closes off the cable bushing 17 for the control or signal cables 4 in order to form a bushing 17 which is closed at the circumference.

The housing upper part 8a additionally has three filling openings 26 which are arranged approximately centrally and also a venting opening 27 in the region of each of the latching hooks 23. The filling openings 26 are used to fill the hollow space 19 of the connection housing 8 with an encapsulation compound when cable ends of the cables 3, 4 are situated in the hollow space and are connected to the connection terminal 9. The venting openings 27 allow the air which is displaced when the encapsulation compound is poured in to escape rapidly. Clamping parts 28 are integrally formed, such that they can pivot at least slightly, on the housing upper part 8a in the region between the latching hooks 23 and the cable bushings 15 in the x-direction at the housing edge.

Figure 5:
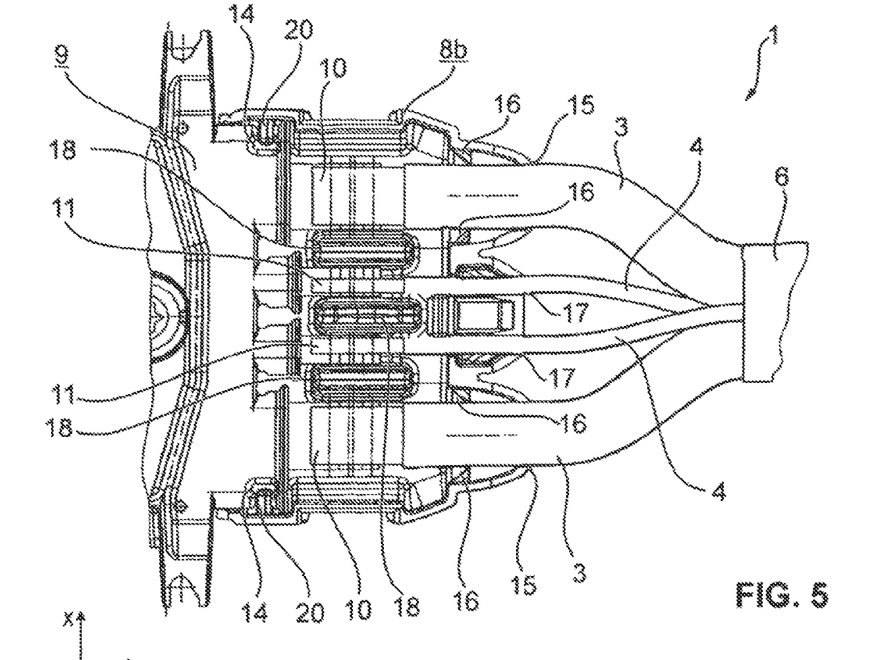
FIG. 5 is a diagrammatic, plan view of the motor connection with cable ends with which contact is made at contact points of the connection terminal and with the housing lower part mounted.

FIG. 5 shows a plan view of the motor or assembly connection 1 in the region of the connection terminal 9 with cable ends of the cables 3 and 4 with which contact is made at the connection contacts 10, 11—for example by welded connections—when the housing lower part 8b is fitted but the housing upper part 8a is not. It can be seen that the fixing elements 20 engage in an interlocking manner in the collar contour 14 of the connection terminal 9. As can likewise been seen, the spacer elements 18 which project upward between the connection cables 3, 4 ensure reliable positioning of the cable ends of the cables 3 and 4 and reliably prevent the cable ends unintentionally coming into contact with one another. The guide inner contours which taper conically in the y-direction and are also open in the direction of the connection terminal 9 rest against the cables 3.

Figure 6:
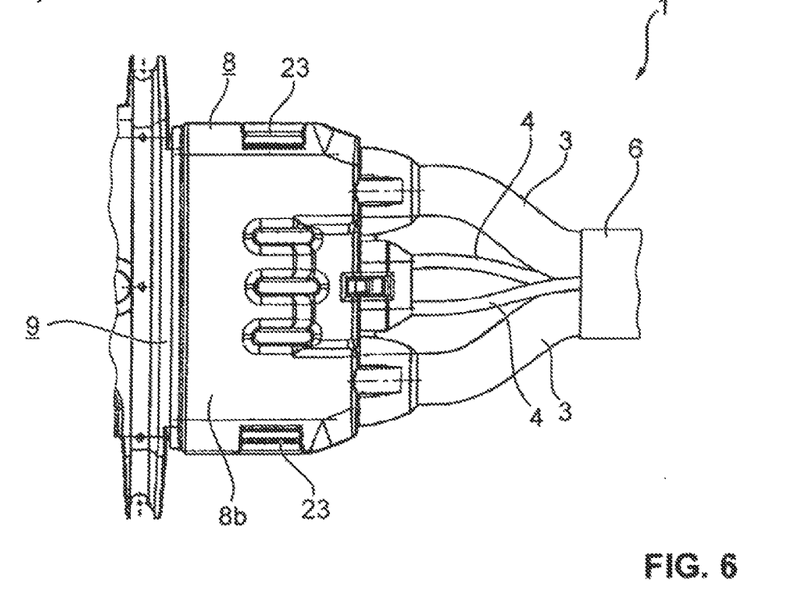
FIG. 6 is a diagrammatic, plan view of the motor connection with the cable harness connected in accordance with FIG. 5 in a view of the mounted connection housing from below.

FIG. 6 shows the motor or assembly connection 1 in a view of the connection housing 8 from below, the hollow space 19 in the connection housing being completely filled with encapsulation compound (not shown). The power supply cables 3 and the signal cables 4 are completely surrounded by the cable bushings 15 and 17. The connection housing 8 is closed off in the region of the connection terminal 9 by way of its encapsulation 13.

Figure 7:
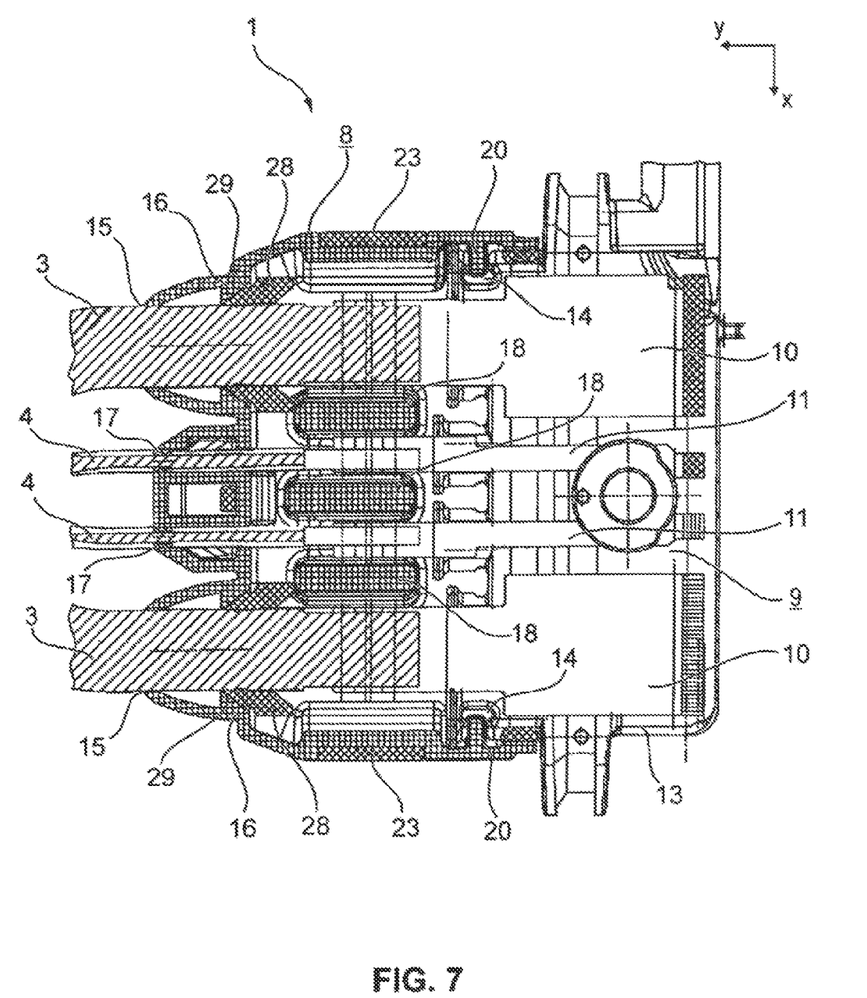
FIG. 7 is a diagrammatic, sectional view which is sectioned parallel to the plane of the drawing of FIG. 6, of the motor connection with the connection housing attached and with individual cables clamped as a tensile loading-relief arrangement.

FIG. 7 shows the motor or assembly connection 1 with the mounted connection housing 8 in section in the y-direction along the center plane of the power supply cables 3. It can be seen that the fixing elements 20 of the housing lower part 8b engage in the corresponding collar contour 14 of the encapsulation 13 of the connection terminal 9. The clamping parts 28 which are integrally formed on the housing upper part 8a are provided with a conical or wedge-like outer contour 29 on that face of the housing upper part 8a which faces the respective guide inner contour 16, the respective clamping part 28 resting on the corresponding guide inner contour 16 by way of the outer contour. In addition, the respective clamping part 28 rests in a force-fitting or frictional manner on the corresponding power supply cable.

The guide inner contours 16 of the housing lower part 8b, which guide inner contours tapers in the y-direction and therefore in the opposite direction to the connection terminal 9, and clamping part outer contours 29 of the housing upper part 8a slide on one another in the manner of a ramp, that is to say in the manner of an oblique plane, in the y-direction when the cable harness 3, 4 or the on-board electrical supply system cable 6 is subjected to tensile loading. On account of the resulting force component, which is produced as a result of the tensile loading in the y-direction transverse to this in the x-direction, an action of force which increases as the tensile force increases is exerted on the cables 3, with the result that the power supply cables 3 are held virtually immobile by the connection housing 8 virtually in the conductor longitudinal direction y.

This relief of tensile loading is effective and therefore particularly advantageous at least for as long as the encapsulation compound which is poured into the connection housing 8 has not yet cured or has not yet completely cured. This in turn has the considerable advantage that, even while the curing process for the encapsulation compound is not yet completed, the assembly or the radiator fan motor 2 with the cable harness 3, 4 already connected and contacted, and therefore with the on-board electrical supply system cable 6 connected, can be supplied to a further production or manufacturing process without the resulting movement having a disadvantageous effect on the attached connection 1. After the encapsulation compound has cured, it is reliably attached to the connection terminal 9 and to the connection housing 8 with a good adhesive bond and is protected against moisture and other environmental influences with a particularly long service life against operation-related mechanical loading.

LIST OF REFERENCE SYMBOLS

1 Motor/assembly connection
2 Radiator fan motor
3 Power supply cable
4 Signal cable
5 Cable harness
6 On-board electrical supply system cable
7 Plug connector
8 Connection housing
8a Housing upper part
8b Housing lower part
9 Connection terminal
10 Connection contact/point
11 Connection contact/point
12 Motor/assembly electronics system
13 Encapsulation
14 Collar contour
15 Cable bushing
16 Guide inner contour
17 Cable bushing
18 Spacer elements
19 Hollow space
20 Fixing element
21 Housing wall
22 Latching recess
23 Latching hook
24 Recess
25 Recess
26 Filling opening
27 Venting opening
28 Clamping part
29 Clamping wedge outer contour

The invention claimed is:
1. An electrical motor connection, comprising:
a curable encapsulation compound;
a connected cable harness having connection-end cable ends being connectable to a motor-end connection terminal, said cable harness having cables;
a connection housing having two housing parts being combined so as to define a hollow space in an assembled state and accommodate said connection-end cable ends of said cable harness, one of said two housing parts having at least one filling opening formed therein, which issues into said hollow space, for pouring in said curable encapsulation compound, and said curable encapsulation compound surrounding said connection-end cable ends in a region of the motor-end connection terminal of an electric motor and joined to said housing parts; one of said two housing parts including at least one cable bushing having a conical guide inner contour which opens in a direction of the motor-end connection terminal; and
another of said two housing parts having a clamping part resting against said conical guide inner contour, and wherein, as a result of tensile loading on said cable harness, said clamping part slides along said conical guide inner contour and increases a clamping action on a corresponding one of said cables as the tensile loading increases.

2. The electrical assembly connection according to claim 1, wherein one of said two housing parts has at least one venting opening formed therein.

3. The electrical assembly connection according to claim 1, wherein said two housing parts include a shell-shaped housing lower part and a cover-shaped housing upper part.

4. The electrical assembly connection according to claim 1, wherein said two housing parts are locked to one another in the assembled state.

5. The electrical assembly connection according to claim 1, wherein:
the connection terminal has a connection-end collar contour; and
one of said two housing parts has at least one fixing element which engages in an interlocking manner in said connection-end collar contour in the assembled state.

6. The electrical assembly connection according to claim 1, wherein said two housing parts in the assembled state engage over the motor-end connection terminal beyond conductor ends.

7. The electrical assembly connection according to claim 3, wherein said shell-shaped housing lower part has said conical guide inner contour which is associated with said corresponding cable, and in that said cover-shaped housing upper part is fitted with said clamping part.

8. The electrical assembly connection according to claim 1, wherein said clamping part has one of a conical-shaped outer contour or a wedge-shaped outer contour which rests against said corresponding cable and tapers in an opposite direction to the motor-end connection terminal.

9. The electrical assembly connection according to claim 1, wherein the electrical assembly connection is for an electrical radiator fan motor of a motor vehicle.

10. An electrical motor connection, comprising:
a curable encapsulation compound;
a connected cable harness having connection-end cable ends being connectable to a motor-end connection terminal, said cable harness having cables; and
a connection housing having two housing parts being combined so as to define a hollow space in an assembled state and accommodate said connection-end cable ends of said cable harness, one of said two housing parts having at least one filling opening formed therein, which issues into said hollow space, for pouring in said curable encapsulation compound, and said curable encapsulation compound surrounding said connection-end cable ends in a region of the motor-end connection terminal of an electric motor and joined to said housing parts, one of said two housing parts having spacer elements projecting into said hollow space between said cables of said cable harness.

11. A radiator fan motor for a motor vehicle, the radiator fan motor comprising:
a motor-end connection terminal; and
an electrical motor connection containing a curable encapsulation compound, a connected cable harness having cables and connection-end cable ends connected to said motor-end connection terminal and a connection housing having two housing parts being combined so as to define a hollow space in an assembled state and accommodate said connection-end cable ends of said cable harness, one of said two housing parts having at least one filling opening formed therein, which issues into said hollow space, for pouring in said curable encapsulation compound, and said curable encapsulation compound surrounding said connection-end cable ends in a region of said motor-end connection terminal and joined to said housing parts;
one of said two housing parts including at least one cable bushing having a conical guide inner contour which opens in a direction of motor-end connection terminal; and
another of said two housing parts having a clamping part resting against said conical guide inner contour, and wherein, as a result of tensile loading on said cable harness, said clamping part slides along said conical guide inner contour and increases a clamping action on a corresponding one of said cables as the tensile loading increases.

* * * * *